United States Patent Office 2,804,571
Patented Aug. 27, 1957

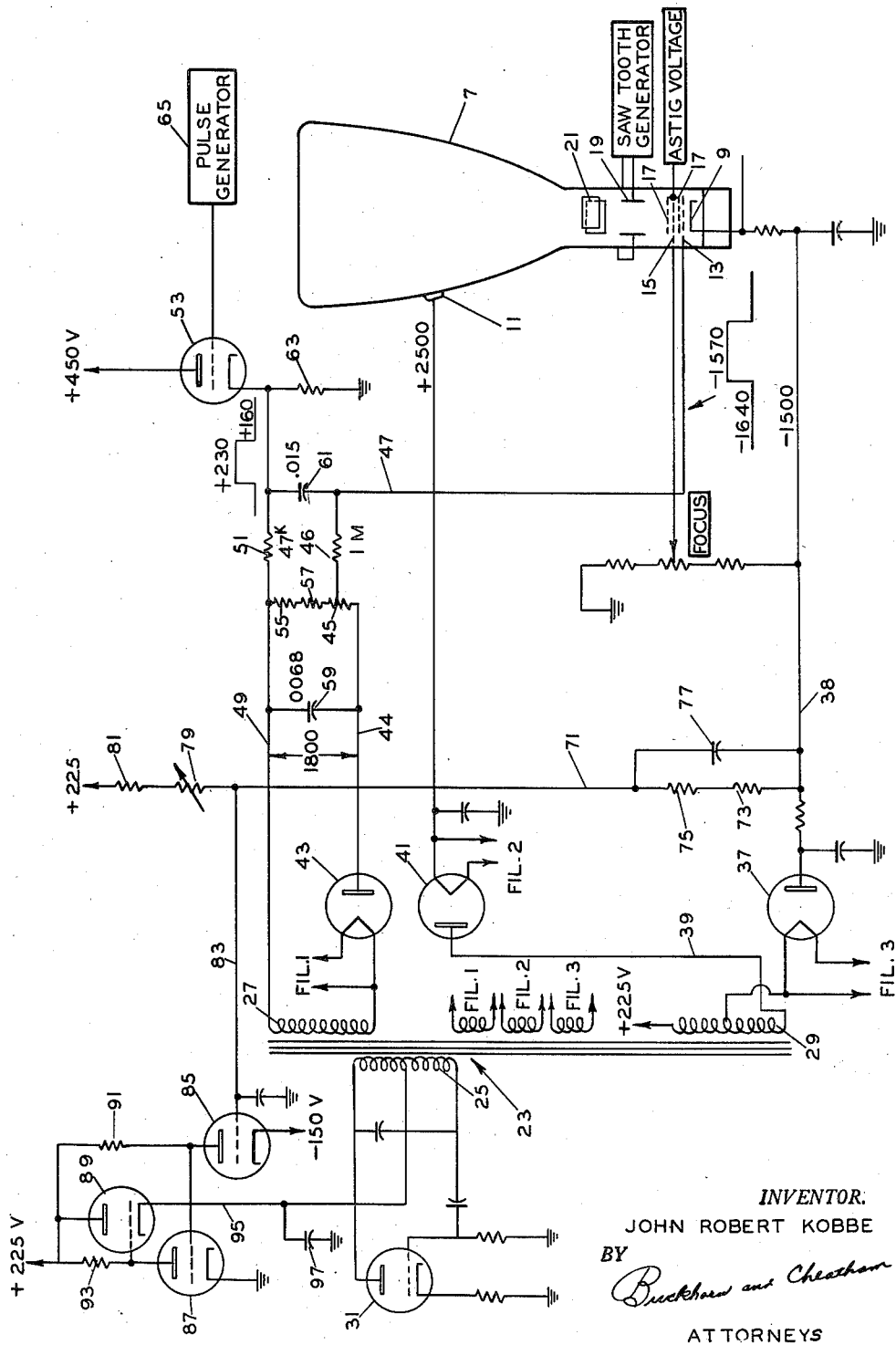

2,804,571

UNBLANKING CIRCUIT FOR CATHODE RAY TUBES

John R. Kobbe, Beaverton, Oreg., assignor to Tektronix, Inc., Portland, Oreg., a corporation of Oregon Application April 20, 1953, Serial No. 349,626

8 Claims. (Cl. 315—22)

This invention relates to a cathode ray tube circuit and particularly to an unblanking circuit for cathode ray tubes incorporated in cathode ray oscilloscopes and like instruments.

In the conventional cathode ray tube unblanking circuit of a cathode ray oscilloscope, the control grid of the cathode ray tube is normally maintained at a voltage sufficiently more negative than that of the cathode as to substantially or entirely cut off the flow of electrons from the cathode to the screen of the cathode ray tube. This is termed "blanking" the tube. The grid bias voltage is usually obtained from the cathode circuit and is applied to the grid through a fixed resistor shunting the circuit for applying voltage pulses to the grid.

Positive unblanking voltage pulses are usually fed to the control grid through a coupling condenser directly connected to the grid. These unblanking pulses drive the grid sufficiently less negative to permit the flow of a beam of electrons from the cathode to the screen, and hence the tube is "unblanked." The positive unblanking pulses are fed to the grid in timed relation to the feeding of sweep voltage pulses to the horizontal-deflection plates of the cathode ray tube, so that the tube is unblanked during the horizontal sweep periods of the sweep pulses.

For convenience in description, when a voltage is said to rise, it is meant that the voltage goes more positive; and when it is said that a voltage falls, it is meant that the voltage goes more negative. Also, the beam deflection elements of the cathode ray tube will be referred to as plates, although, of course, they could be coils.

At very low sweep speeds, the grid voltage rise caused by the leading edge of an unblanking pulse is not maintained during the entire sweep period, despite the fact that the unblanking pulse is of the same duration as the sweep pulse, because of current flow through the shunting resistor above referred to. Hence, the grid potential progressively becomes more negative so as to decrease the flow of electrons, and thus the trace of the electron beam on the screen of the tube becomes dimmer, and this trace may be entirely cut off before the horizontal sweep is completed. This means that any waves, or part of a wave, placed on the vertical-deflection plates of the cathode ray tube during the latter part of such a slow sweep period cannot be properly observed or studied.

Another disadvantageous operating feature of the conventional unblanking circuit well known to those skilled in the art is that, as the duty cycle of the unblanking pulses increases, the crest voltage on the grid becomes more negative and hence the unblanking pulses become less effective in unblanking the tube. In order to compensate for this condition, it is necessary for the operator to increase the beam intensity setting of the cathode ray oscilloscope.

A main object of the present invention is to provide an unblanking circuit for a cathode ray tube overcoming the above disadvantages. More particularly, it is a main object of the present invention to provide a grid bias voltage supply directly connected in series between the control grid of the cathode ray tube and a positive unblanking pulse input means and otherwise electrically isolated from the electrodes of the cathode ray tube. By the above arrangement, it is immaterial as to the duration of the positive input pulse because the grid voltage, when driven in a positive direction, will be held in such condition until the positive pulse terminates, and therefore the intensity of the electron beam during the unblanking period will remain constant, thus permitting as slow a horizontal sweep as desired. Also, the crest grid voltage will not become more negative when the duty cycle of the unblanking pulses is increased, because the grid power supply is itself driven more positive; hence there will be no necessity for the operator having to adjust the beam intensity setting under such conditions.

With an arrangement as just described, the leading edge of an unblanking pulse would be slightly delayed in being applied to the control grid, because the unblanking pulse must charge the stray capacitance of the grid voltage supply to ground. This delaying action is undesirable because it would mean that the first part of the sweep trace would not appear on the face of the cathode ray tube, or would only dimly appear, hence rendering it difficult or impossible to observe the first part of a wave being studied, or resulting in the entire loss of short, transient pulses applied to the vertical-deflection plates during the beginning of the sweep trace.

It is another object of the present invention to provide, in an arrangement as last described, capacitance means coupling the unblanking pulse input means to the grid of the cathode ray tube and arranged in parallel relation with the direct coupling means, so that the leading edge of an unblanking pulse may immediately pass through the capacitance means directly to the grid, and consequently the first part of the sweep trace immediately appears on the cathode ray tube with the same intensity that the remainder of the trace appears.

A further object of the present invention is to provide a circuit as immediately described above designed so that the charge on the capacitance means is substantially prevented from decreasing in the brief period during which the power supply is being driven to its less negative condition.

A further object of the present invention is to provide an unblanking circuit of the type generally described above, wherein there is a common power source from which the voltages of the cathode and grid of the cathode ray tube are derived, so that any variation in the voltage of the common power source will cause a similar change in each of the cathode and grid voltages, and consequently these voltages will drift in unison so as to maintain the voltage difference between the cathode and the grid constant, except as the grid voltage is altered by the unblanking pulses.

It is still another object of the present invention to provide an arrangement of the type just described above, wherein there are feedback regulator circuit means connecting the cathode circuit of the cathode ray tube and the common power source, so as to regulate the voltage output of the common power source against permanent variation from an adjustable value.

For a consideration of what is believed novel and inventive, attention is directed to the following description taken in connection with the accompanying drawing, while the features of novelty will be pointed out with greater particularity in the appended claims.

In the drawings, the single figure discloses a circuit diagram of a cathode ray tube unblanking circuit embodying the concepts of the present invention.

Referring to the drawing, there is disclosed a circuit wherein it will be noted that in some instances the resistors and condensers have been given specific values, and that specific values have been assigned to various lines. This disclosure is not intended to be limiting on the invention, but merely to make a full disclosure of one circuit embodying the concepts of the present invention. Therefore, the invention will be defined in the accompanying claims, whereas the specification will be employed to describe in particular one circuit embodying the concepts of the present invention.

There is disclosed in the figure, a cathode ray tube, generally indicated at 7, having a cathode 9, a post accelerating anode 11, a control grid 13, a focus element 15, astigmatism anode elements 17, horizontal-deflecting plates 19, and vertical-deflecting plates 21.

A single power source is provided from which is derived a high positive voltage for anode 11, high negative voltages for cathode 9 and grid 13, and a lower negative voltage for the focus element 15. This common power source includes a high frequency step-up transformer 23, including a primary winding 25 and two secondary windings 27 and 29. Primary winding 25 is supplied with high frequency voltage from an oscillator tube 31 which, together with the primary winding and the various resistors and condensers shown associated with these parts, constitutes a Hartley oscillator.

Secondary winding 29 provides a power supply for cathode 9 and post accelerating anode 11. An intermediate tap of winding 29 is connected to the cathode of a vacuum tube rectifier 37, the plate of which is connected through a filter circuit and a line 38 to the cathode 9 of the cathode ray tube. A line 39 connects the lower end of secondary winding 29 to the plate of a vacuum tube rectifier 41, which is directly coupled by its cathode to the post accelerating anode 11. The upper end of winding 29 is connected to a source of positive regulated voltage as shown.

By means of the power supply including winding 29 and rectifiers 37 and 41, the cathode is maintained at a high negative voltage and the post accelerating anode at a high positive voltage. A negative focus voltage is taken off lead 38, as is apparent from the drawing.

Various filter condensers and resistors are provided in connection with rectifiers 37 and 41, but these need not be described in detail. Also, the filament voltages for these tubes, and another rectifier to be presently mentioned, are provided by small secondary windings of transformer 23, as is apparent from the similar designations shown on the small secondary windings and on the filaments of the rectifier tubes.

Astigmatism anode elements 17 are maintained at approximately ground potential, and thus positive with relation to cathode 9 and, since anode 11 is maintained at a high positive voltage, the astigmatism anode elements and the post accelerating anode are capable of creating an electron beam from cathode 9 to the screen of the cathode ray tube.

However, a circuit is provided for normally blanking the tube, that is, cutting off the flow of electrons. This circuit includes secondary winding 27, previously mentioned, the lower end of which is connected to the cathode of a vacuum tube rectifier 43, the plate of which is coupled by a line 44 through a potentiometer 45 and a fixed resistor 46 to a line 47 which is connected to the control grid 13. The upper end of secondary winding 27 is connected by a line 49 through a fixed resistor 51 to the cathode of a cathode follower 53, about which more will presently be said. Connecting lines 44 and 49 are fixed resistors 55 and 57 and potentiometer 45, previously mentioned. A filter condenser 59 is connected between lines 44 and 49 at a place to the left of potentiometer 45 and resistors 46, 51, 55, and 57, while line 47 is connected to line 49 through a grid condenser 61 at a place to the right of said resistors and potentiometer.

The above arrangement provides on lines 44 and 47 and grid 13 a high negative voltage of a value sufficient to blank the cathode ray tube. By adjusting potentiometer 45, the potential applied to grid 13 may be adjusted. Thus, potentiometer 45 is the beam intensity control adjustment.

The cathode of tube 53 is connected to ground through a fixed resistor 63, whereas the plate of this tube is connected to a medium high positive voltage as indicated. The grid of tube 53 is maintained at such a potential by a pulse generator, shown only in block diagram form at 65, that it is normally conducting, so that line 49 is at a positive potential because of the voltage drop across resistor 63. A positive unblanking pulse is adapted to be fed to the grid of tube 53 from the pulse generator, so that the conductivity of the tube increases to a place a corresponding positive pulse on line 49, because of the increased voltage drop across resistor 63.

The operation of the portion of the unblanking circuit so far described is as follows. The voltage supply provided by secondary winding 27, rectifier 43, potentiometer 45, resistors 57 and 55, and condenser 59, is connected in series between grid 13 and cathode follower 53 and is otherwise electrically isolated from the electrodes of the cathode ray tube so as to constitute a floating power supply which may be driven in accordance with the variations of the voltage placed on its positive side, that is, line 49.

As before mentioned, the negative side of the voltage supply normally has a potential which is sufficiently negative to blank the cathode ray tube. However, when an unblanking pulse is applied to line 49 from cathode follower 53, it has a sufficiently positive value to drive the floating power supply, and therefore grid 13, less negative an extent so as to unblank the cathode ray tube. Since the power supply is floating, the power supply, and therefore the grid, will be held in their driven condition for the extent of the duration of the positive unblanking pulse, no matter how long that may be. Thus, the sweep speed can be made as slow as desired. It is, of course, evident that the unblanking pulses are applied to grid 13 in timed relation to the application of the sweep pulses to horizontal-deflection plates 19 of the cathode ray tube.

The floating voltage supply for grid 13 unavoidably has certain stray capacitance which would tend to delay the leading edge of an unblanking pulse in reaching grid 13, until the stray capacitance charges due to the increase in the voltage on line 49. This would result in cutting out or dimming the first part of the sweep trace.

To eliminate the above-described undesirable operating condition, condenser 61 and resistors 51 and 46 have been provided. Resistor 46 has a much higher value than resistor 51, and condenser 61 has a much higher value than that of the stray capacitance of the grid voltage supply, for reasons to presently appear. For instance, the stray capacitance may have a value of .015 micro-microfarad, whereas the condenser may have a value of .015 microfarad.

When an unblanking pulse is applied to line 49 from cathode follower 53, it is immediately transmitted through condenser 61 to grid 13. Resistor 46 is made sufficiently large so that the charge on condenser 61 will not change materially during the brief period necessary to drive the floating power supply to its more positive condition, the length of this period being determined by the value of the stray capacitance of the grid power supply and by the size of resistor 51. Resistor 51 is made relatively small and, since the stray capacitance has a value much less than that of condenser 61, the stray capacitance may be charged through resistor 51 to ground, by an amount corresponding to the voltage increase caused by the positive pulse, well before any appreciable change in the charge on condenser 61 has occurred. Thus, the voltage drop initially appearing across resistor 46, caused by the leading portion of an unblanking pulse passing through condenser 61, is quickly reduced to zero. Thus, the continuity of an unblanking pulse supplied to grid 13 is maintained, the condenser 61 being responsible for the initial portion, and the voltage supply being responsible for the remainder.

Another way of stating the above matter is to say that the time constant of the portion of the circuit containing the stray capacitance of the grid voltage supply and resistor 51 is very much less than the time constant of the portion of the circuit containing condenser 61 and resistor 46. Thus, the negative side of the grid power supply is brought up to the potential of the negative side of condenser 61, when an unblanking pulse is applied to line 49, well before there is any appreciable change in the charge on condenser 61.

When the unblanking pulse terminates, the grid voltage instantly drops through condenser 61 to its original value, the voltage drop appearing across resistor 46 being eliminated when, after a brief period during which the stray capacitance of the grid voltage power supply discharges, the power supply has dropped to its more negative condition.

In the conventional unblanking circuit, the longer the pulse duration, the more the negative side of the grid condenser tends to return to its original more negative condition, because of the supply thereto of electrons from the cathode circuit through the conventional shunt resistor through which the grid bias voltage is applied. Thus, not only would the trace become dimmer and disappear, but when the trailing edge of the pulse arrived it would drive the grid voltage more negative than it was originally. If the next unblanking pulse arrived shortly thereafter, it would be incapable of unblanking the cathode ray tube because of the more negative condition of the grid. As the tube operation continued, the crest voltage of the grid would be held down to a value below its original value, and thus make operation of the tube unsatisfactory.

The ratio of the duration of an unblanking pulse to the duration of an unblanking cycle is called the duty cycle of the unblanking pulses. As this duty cycle increases, as when the duration between unblanking pulses decreases relative to the duration of an unblanking pulse, the crest voltage on the grid becomes increasingly more negative, because the time allowed for pulling the negative side of the condenser down from its less negative condition, caused by the leading edge of an unblanking pulse, increases and the time for building up the negative side of the condenser toward its original potential decreases. Operators of cathode ray oscilloscopes are familiar with this problem and adjust the intensity setting in an amount proportional to the percentage value of the duty cycle to raise the average grid voltage so as to compensate for the above condition.

With the circuit of the present invention, there is no necessity for adjusting the intensity setting because of an increased duty cycle. This is so because the floating power supply holds the negative side of the condenser and the grid at their less negative conditions during an unblanking pulse and thus, when the trailing edge of an unblanking pulse arrives, it merely returns the grid to its original condition.

If, during the operation of the overall circuit, the voltage difference between the cathode and the grid varied, apart from variations caused by the unblanking pulses, there would be a corresponding variation in the beam intensity from the intensity desired, and thus the effect that an unblanking pulse would have on the beam intensity would vary. An arrangement is provided for maintaining a desired voltage difference between grid 13 and cathode 9 despite changes in the absolute values of the grid and cathode voltages, except, of course, for those changes in the grid voltage caused by the unblanking pulses.

This arrangement takes the form of providing a common power source, the Hartley oscillator, from which the cathode and grid derive their voltages. The secondary windings 27 and 29 are closely magnetically coupled and the number of turns in the portion of the winding 29 from which the negative cathode voltage is derived and the number of turns in the winding 27 are made substantially the same. Thus, when the voltage output of the oscillator varies, the absolute values of the voltages induced in secondary windings 27 and the portion of the winding 29 just referred to will correspondingly vary by substantially the same amount, and thus the difference between the grid and cathode voltages, received respectively from windings 27 and 29, will remain constant, subject only to the variations caused by the unblanking pulses.

An arrangement is provided for preventing a permanent drift of the oscillator output from an adjustable value. This arrangement includes a line 71 connected to line 38 through a parallel circuit including resistors 73 and 75, and a condenser 77. The upper end of line 71 is connected by a variable resistor 79 and a fixed resistor 81 to a source of regulated positive voltage.

Connecting line 71 to the grid of an amplifier tube 85 is a line 83. Line 71 may thus be considered as a voltage divider line wherein a desired voltage on line 83 is attained by adjusting the value of resistor 79, this voltage varying with the cathode voltage for any given setting of the resistor 79.

The cathode of amplifier tube 85 is connected to a regulated negative voltage of a predetermined value as shown. The plate of tube 85 is directly coupled to the grid of a second amplifier tube 87, the plate of which is directly coupled to the grid of a cathode follower 89. The plate of cathode follower 89 is directly connected to a regulated supply of positive voltage, as indicated in the drawing. The plates of tubes 85 and 87 are connected by resistors 91 and 93, respectively, to this source of positive regulated voltage.

The cathode of tube 89 is directly connected by a line 95 to the center tap of primary winding 25, line 95 being connected to ground by a by-pass condenser 97.

The operation of the above-described circuit is as follows. Resistor 79 is adjusted so that tube 85 is slightly conducting. This slight conduction drops the voltage of the grid of tube 87, but not enough to prevent fairly good conduction of this tube. This action drops the grid of tube 89, but not enough to prevent high conduction of this tube. When tube 89 is highly conductive, the cathode potential approaches that of the plate. Line 95 being connected to the cathode of tube 89 therefore constitutes the supply of positive voltage for oscillator tube 31.

Now assume for any reason that there is a voltage rise in the output of oscillator tube 31. This means that the voltage in line 38 will go more negative to cause the grid of amplifier tube 85 to go more negative, and thus the plate of this tube goes more positive, because, as tube 85 is driven toward cut-off, the plate voltage will more closely approach the value of the regulated positive voltage supply to which it is connected. Thus, the grid of amplifier tube 87 will go more positive and the plate of this tube will become less positive as it approaches the ground potential of the cathode. Since the plate of tube 87 is connected to the control grid of cathode follower 89, as the plate of tube 87 becomes less positive, tube 89 will be rendered less conductive, hence the cathode of tube 89 will become less positive. This cathode, being coupled to the plate of oscillator tube 31, decreases the power supply for the oscillator tube and thus returns the output voltage of the tube to its original value. This action prevents any permanent drift of the output of the oscillator. The reverse action will occur if the output of oscillator tube 31 decreases.

Variable resistor 79 provides an adjustment means by which the output of the oscillator may be varied, because varying resistor 79 varies the grid bias voltage placed on the grid of tube 85 of the regulator circuit.

By the present invention, an unblanking circuit has been provided for a cathode ray tube enabling as slow sweep speeds as desired to be attained while maintaining a sweep trace of a constant bright intensity. Furthermore, the duty cycle of the unblanking pulses may be increased without requiring the operator to adjust the beam intensity setting to maintain proper trace intensity. The unblanking circuit is designed so that the first part of the sweep trace appears on the screen of the cathode ray tube with the same brightness as the remainder.

Another advantage of the unblanking circuit is that there is a common power source from which the grid and cathode voltages are derived, so that, if the output of the common power source varies, the voltage difference between the grid and cathode does not change. There is further provided a feedback regulating system for preventing permanent drift of the common power source from a predetermined adjustable value.

Having described the invention in what is considered to be a preferred embodiment thereof, it is desired that it be understood that the specific details shown are merely illustrative and that the invention may be carried out in other ways.

I claim:

1. In a cathode ray oscilloscope circuit, a cathode ray tube, a grid bias voltage supply for the control grid of the cathode ray tube, a pulse input means for supplying voltage pulses, a circuit connecting one side of said pulse input means to the cathode of said tube, said grid bias voltage supply being connected in series between the other side of said pulse input means and the control grid of the cathode ray tube and being otherwise electrically isolated from the electrodes of the cathode ray tube, whereby the voltage of the grid accurately follows the wave form of such pulse despite the duration or duty cycle of such pulses.

2. In a combination with a cathode ray tube, means for supplying a negative voltage to the cathode of the tube and a positive voltage to the anode means of the tube, an unblanking circuit including a power supply having its negative side connected to the control grid of the tube, a source of positive voltage pulses having one side connected to the positive side of said power supply, a circuit connecting the other side of said source to the cathode of said tube, the voltage of the power supply being sufficient to normally substantially cut off the flow of electrons from the cathode to the screen of the cathode ray tube so as to blank said tube, said power supply being otherwise electrically isolated from the electrodes of said tube, whereby the control grid voltage follows the wave form of each positive pulse to unblank the tube for the duration of each positive pulse.

3. In combination with a cathode ray tube, an unblanking circuit including a power supply having its negative side connected to the control grid of the tube, means supplying positive voltage pulses and having one side connected to the positive side of said power supply, a circuit connecting the other side of said means to the cathode of said tube, the voltage of the power supply being sufficient to normally substantially cut off the flow of electrons from the cathode to the screen of the cathode ray tube to thereby blank said tube, said power supply being otherwise electrically isolated from the electrodes of said tube so that the grid is brought to a less negative condition unblanking said tube for the duration of each positive pulse.

4. In combination, a cathode ray tube having a control grid, an anode and a cathode, an unblanking circuit for the cathode ray tube including a first power supply connected to said grid for impressing a high negative voltage on said grid with respect to said cathode, a separate power supply connected between said anode and said cathode for impressing a high positive voltage on said anode with respect to said cathode, a common power source from which said power supplies derive their energy, whereby a change in the output of the power source affects both power supplies similarly, and means for supplying voltage pulses connected between said cathode and the positive side of the first power supply, said first power supply being otherwise electrically isolated from the electrodes of said tube, whereby the voltage of said grid follows the wave forms of the pulses.

5. In combination, a cathode ray tube having a control grid, an anode and a cathode, an unblanking circuit for the cathode ray tube including a first power supply directly connected to said grid for impressing a high negative voltage on said grid with respect to said cathode, a separate power supply connected between said anode and said cathode for impressing a high positive voltage on said anode with respect to said cathode, a controllable common power source from which said power supplies derive their energy so that a change in the power output of the power source affects both power supplies similarly, means for supplying voltage pulses connected between said cathode and the positive side of the first power supply, said first power supply being otherwise electrically isolated from the electrodes of said tube so that the voltage of said grid follows the wave forms of the pulses, and feedback regulator means responsive to variations in the voltage of said separate power supply for preventing permanent drift of the output of the common power source from a predetermined value.

6. In combination, a cathode ray tube, circuit means providing a voltage between the cathode and anode means of the tube, a power supply having its negative side connected to the control grid of the tube through a resistance, means supplying positive voltage pulses and connected to the positive side of said power supply through a resistance, the voltage of said power supply being sufficient to substantially cut off the flow of electrons from the cathode to the anode in the periods between said positive pulses, said power supply being otherwise electrically isolated from the electrodes of said tube, and a capacitance coupling the last-named means directly to the grid so as to shunt said power supply and said resistances and transmit the leading edge of a positive pulse directly to the grid of the tube through the capacitance, the stray capacitances of said power supply being thereafter charged by such pulse.

7. A cathode ray oscilloscope circuit, including a cathode ray tube having an anode, a cathode and a control grid, power supply means connected to said anode and cathode for supplying a negative voltage to the cathode and a positive voltage to the anode of the tube, a source of control voltage for said grid, a power supply means connected in series between said source and said grid for supplying a negative voltage to the grid of a value sufficient to cut off the flow of electrons from the cathode to the anode, the last-named power supply means being otherwise electrically isolated from the electrodes of said tubes, a high frequency transformer having a primary coil and a plurality of secondary coils, each of said power supply means comprising a secondary coil of said high frequency transformer, said secondary coils being closely magnetically coupled whereby the power supplies drift together, a high frequency oscillator connected to the primary coil of the transformer, and means responsive to changes in a voltage in the first-named power supply means for controlling said oscillator to regulate the output of the high frequency oscillator so as to maintain said voltages substantially constant.

8. A cathode ray oscilloscope circuit, including a cathode ray tube having a cathode and a control grid, a power supply having its negative side connected through a first resistance to the grid of the cathode ray tube, the voltage of said power supply being sufficient to normally prevent conduction within the cathode ray tube, a positive voltage pulse input means connected through a second resistance to the positive side of said power supply to supply positive unblanking pulses of sufficient value to unblank the cathode ray tube for the duration of each positive pulse, a coupling capacitance connected directly between the positive pulse input means and said grid, said power supply being otherwise electrically isolated from the electrodes of said tube and the time constant of the portion of the circuit including the stray capacitance of the power supply and the second resistance means being substantially less than the time constant of that portion of the circuit including the coupling capacitance and said first resistance so that the leading edge of a positive pulse is immediately transmitted through the coupling capacitance to the grid of the cathode ray tube and said stray capacitance is charged by the positive pulse before any appreciable variation in the charge on the coupling capacitance has occurred.

References Cited in the file of this patent

UNITED STATES PATENTS

| | | |
|---|---|---|
| 2,363,810 | Schrader et al. | Nov. 28, 1944 |
| 2,439,321 | Starr | Apr. 6, 1948 |
| 2,448,771 | Christaldi | Sept. 7, 1948 |
| 2,477,615 | Isbister | Aug. 2, 1949 |
| 2,492,700 | Jeanne | Dec. 27, 1949 |
| 2,520,155 | Liekens | Aug. 29, 1950 |
| 2,521,146 | Blayney | Sept. 5, 1950 |
| 2,522,967 | Shaw | Sept. 19, 1950 |
| 2,617,964 | Blayney | Nov. 11, 1952 |
| 2,620,455 | Fockler | Dec. 2, 1952 |